US010386107B2

(12) United States Patent
Xia et al.

(10) Patent No.: US 10,386,107 B2
(45) Date of Patent: Aug. 20, 2019

(54) REFRIGERATOR AND AIR PASSAGE DEVICE THEREOF

(71) Applicant: QINGDAO HAIER JOINT STOCK CO., LTD., Qingdao, Shandong Province (CN)

(72) Inventors: Enpin Xia, Qingdao (CN); Huimin Zhang, Qingdao (CN); Hao Zhang, Qingdao (CN); Xiaobing Zhu, Qingdao (CN)

(73) Assignee: QINGDAO HAIER JOINT STOCK CO., LTD., Qingdao, Shandong Province (CN)

( * ) Notice: Subject to any disclaimer, the term of this patent is extended or adjusted under 35 U.S.C. 154(b) by 7 days.

(21) Appl. No.: 15/748,194

(22) PCT Filed: Jun. 17, 2016

(86) PCT No.: PCT/CN2016/086181

§ 371 (c)(1),
(2) Date: Jan. 28, 2018

(87) PCT Pub. No.: WO2017/067189

PCT Pub. Date: Apr. 27, 2017

(65) Prior Publication Data

US 2018/0216866 A1 Aug. 2, 2018

(30) Foreign Application Priority Data

Oct. 23, 2015 (CN) .......................... 2015 1 0698479

(51) Int. Cl.
*F25D 17/04* (2006.01)
*F25D 17/06* (2006.01)

(52) U.S. Cl.
CPC ........... *F25D 17/045* (2013.01); *F25D 17/04* (2013.01); *F25D 17/065* (2013.01)

(58) Field of Classification Search
CPC ....... F25D 17/045; F25D 17/065; F25D 17/04
See application file for complete search history.

(56) References Cited

U.S. PATENT DOCUMENTS

2010/0107678 A1* 5/2010 Kim ...................... F25D 17/065 62/419
2011/0225994 A1* 9/2011 Fotiadis ................ F25D 17/062 62/80

FOREIGN PATENT DOCUMENTS

CN 103344074 A * 10/2013
CN 103344074 A 10/2013

(Continued)

*Primary Examiner* — Emmanuel E Duke
(74) *Attorney, Agent, or Firm* — Cheng-Ju Chiang

(57) ABSTRACT

A refrigerator and an air passage device thereof. The air passage device comprises an air passage cover plate, an air passage foam, and an air door which comprises: a base plate part provided with at least one arcuate guide hole and an elongate through hole parallel with the arcuate guide hole, wherein the hole wall of at least a part of the arcuate guide holes is provided with multiple limiting portions, and the elongate through hole is arranged close to the side at which the hole wall is provided with the limiting portions; and a shielding part which adjusts the ventilation area of the air passage when being rotated, and at least one guide column, which is inserted into a corresponding arcuate guide hole and cooperates with the arcuate guide hole by interference fit. The air door is simple in structure, convenient in operation and does not consume any power.

18 Claims, 4 Drawing Sheets

(56) References Cited

FOREIGN PATENT DOCUMENTS

| | | | |
|---|---|---|---|
| CN | 103411368 | A | 11/2013 |
| CN | 103411369 | A | 11/2013 |
| CN | 203286838 | U | 11/2013 |
| CN | 204177014 | U | 2/2015 |
| CN | 204478637 | U | 7/2015 |
| CN | 105222469 | A | 1/2016 |
| CN | 205119612 | U | 3/2016 |
| EP | 0898134 | A2 | 2/1999 |

* cited by examiner

REFRIGERATOR AND AIR PASSAGE DEVICE THEREOF

CROSS REFERENCE TO RELATED APPLICATIONS

The present application is a 35 U.S.C. § 371 National Phase conversion of International (PCT) Patent Application No. PCT/CN2016/086181, filed on Jun. 17, 2016, which further claims benefit of Chinese Patent Application No. 201510698479.5, filed on Oct. 23, 2015, the disclosure of which is incorporated by reference herein. The PCT International Patent Application was filed and published in Chinese.

TECHNICAL FIELD

The present invention relates to a refrigerating and freezing apparatus, and in particular to a refrigerator and an air passage device thereof.

BACKGROUND OF THE INVENTION

An evaporator of an air-cooled refrigerator is usually arranged in an independent cooling chamber, and air passages are arranged at the rear side of the article storage compartments to transport the cooling air in the cooling chamber to the article storage compartments. Air doors are arranged in the air passages to open or close the air passages or adjust the ventilation areas of the air passages to adjust the temperatures of the article storage compartments.

The air doors in the prior art are usually electric air doors, which can adjust accurately, have high controllability, but are costly, complex in structure and control, and will consume some power during use.

SUMMARY OF THE INVENTION

One object of the present invention is to provide an air passage device without an electric door to solve one of the above defects of the prior art.

Another object of the present invention is to provide a refrigerator having the air passage device.

In one aspect, the present invention provides an air passage device of a refrigerator, which comprises: an air passage cover plate arranged in front of a rear wall of a refrigerator inner tank and air passage foam arranged between the refrigerator inner tank and the air passage cover plate, the air passage foam defining an air passage, and the air passage device further comprising at least one air door, wherein the air door comprises: a base plate part which is rotatably attached to the inner wall of the air passage cover plate, and is provided with at least one arcuate guide hole with one hole wall of one arcuate guide hole and an elongate through hole parallel with the arcuate guide hole, wherein the hole wall of at least a part of the arcuate guide holes is provided with multiple limiting portions, and the elongate through hole is arranged close to the side at which the hole wall is provided with the limiting portions; and a shielding part which extends rearwards into the air passage from an edge of the base plate part and is configured to adjust the ventilation area of the air passage when being rotated along with the base plate part, wherein the inner wall of the air passage cover plate extends rearwards to form at least one guide column, which is inserted into a corresponding arcuate guide hole and cooperates with the arcuate guide hole by interference fit so that when the base plate part rotates, the hole wall of the arcuate guide hole close to the elongate through hole is elastically deformed to cause the guide column to enter the limiting portion to limit the rotation freedom of the base plate part.

Alternatively, the shielding part is an arcuate baffle plate extending rearwards from the edge of the base plate part.

Alternatively, the air passage foam is provided with an arcuate make-way recess to allow the arcuate baffle plate to pass through.

Alternatively, the base plate part is of a circular plate structure; and the inner wall of the air passage cover plate is provided with an annular protruding rib protruding outwards so that the base plate part can be rotatably arranged at a radial inner side of the annular protruding rib.

Alternatively, the chord length of the arcuate baffle plate is larger than the distance between two transverse sidewalls of the air passage; and at least one transverse sidewall of the air passage is provided with an arcuate notch matched with the outer diameter of the arcuate baffle plate.

Alternatively, there are two arcuate guide holes, and one hole wall of one arcuate guide hole is provided with multiple limiting portions; and there are two guide columns arranged at 180 degrees relative to each other.

Alternatively, the limiting portion is a recess portion recessed from the hole wall of the arcuate guide hole and away from the arcuate guide hole.

Alternatively, the front surface of the base plate part is provided with a circular knob; and the air passage cover plate is provided with a circular make-way hole to allow the circular knob to extend out.

Alternatively, the circular knob and the base plate part are of an integral member made by an integral formation process.

In another aspect, the present invention provides a refrigerator comprising a refrigerator inner tank, an article storage compartment defined by the refrigerator inner tank, and a cooling chamber having an evaporator arranged therein, the refrigerator being further comprising: the air passage device according to any of the above solutions, which is configured to transport cooling air from the cooling chamber to the article storage compartment via the air passage of the air passage device and adjust a flow rate of the cooling air entering the article storage compartment using the air door.

In the refrigerator and the air passage device of the present invention, an air door which can manually adjust the ventilation area of the air passage is used, so the air door does not consume power compared with an electric air door. As the air door is arranged with arcuate guide holes whose hole walls are arranged with limiting portions, the adjustment process is more accurate and reliable. By arranging the elongate through hole, when the guide column moves in the arcuate guide hole, the hole wall of the arcuate guide hole is elastically deformed, so that the arcuate guide hole can clamp the guide column tightly and changes of the air discharging area of the air passage due to displacement of the air door can be prevented.

Further, in the air passage device of the present invention, the air door has two arcuate guide holes and two guide columns, so that rotation deflection of the base plate part can be avoided. In addition, as the circular knob extends into the article storage compartment from the circular make-way recess of the air passage cover plate, the user can stretch a hand into the article storage compartment to rotate the circular knob, and the operation is very convenient. The circular knob and the base plate part are designed into an integral member, which simplifies the manufacturing and assembling processes of the air door.

Through the detailed description of the embodiments of the present invention with reference to the drawings, those skilled in the art will understand the above and other objects, advantages and features of the present invention more clearly.

BRIEF DESCRIPTION OF THE DRAWINGS

The followings will describe some embodiments of the present invention in detail in an illustrative rather than restrictive manner with reference to the drawings. The same or similar reference signs in the drawings represent the same or similar member or part. Those skilled in the art shall understand that these drawings may not be drawn according to the scales. In the drawings.

DETAILED DESCRIPTION

Figure 1:
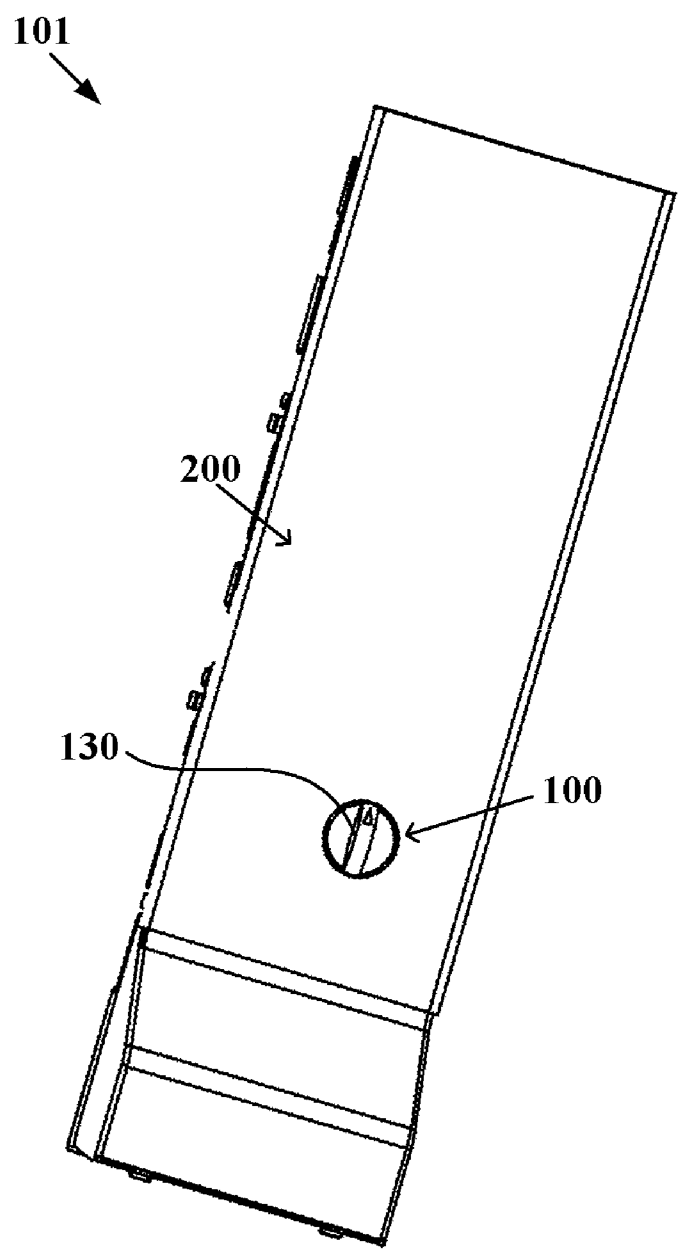
FIG. 1 is a schematic structural view of an air passage device of a refrigerator according to an embodiment of the present invention.
Figure 2:
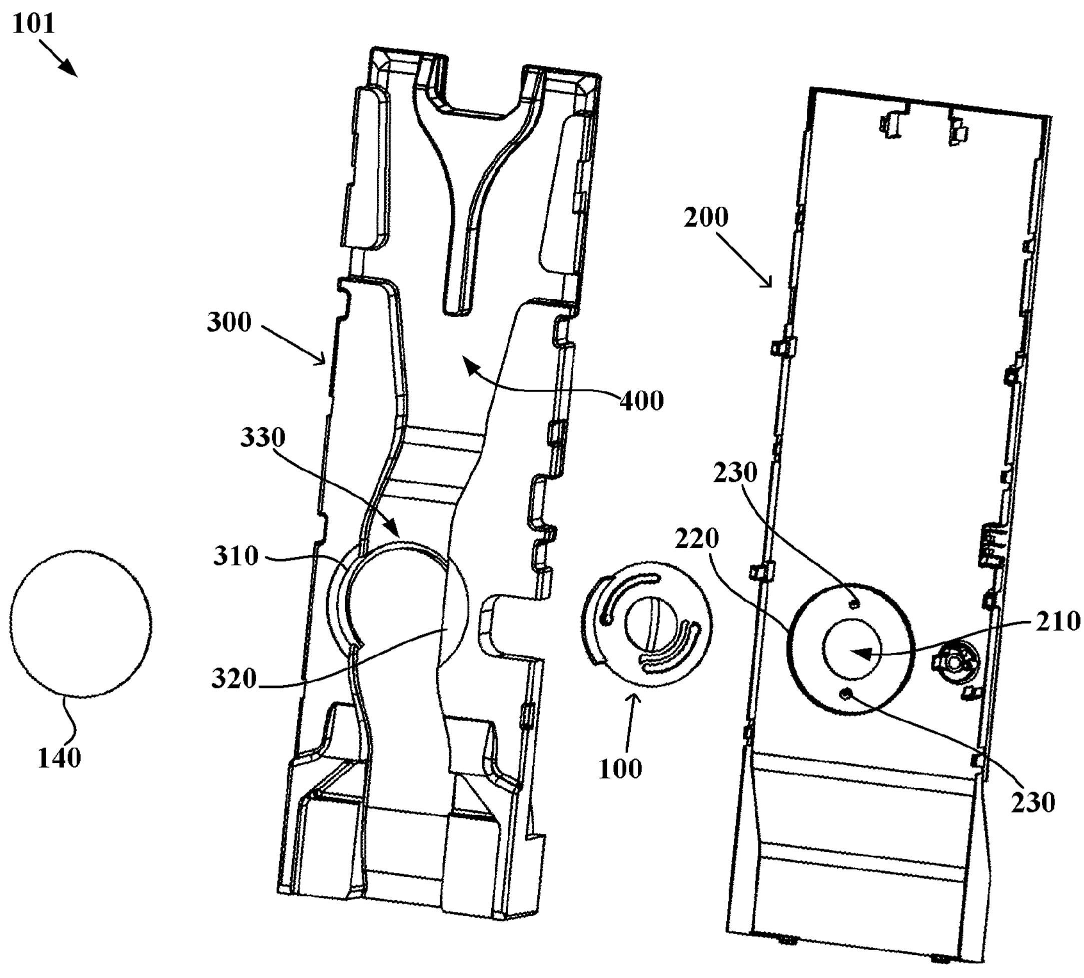
FIG. 2 is schematic exploded view of the air passage device shown in FIG. 1.
Figure 3:
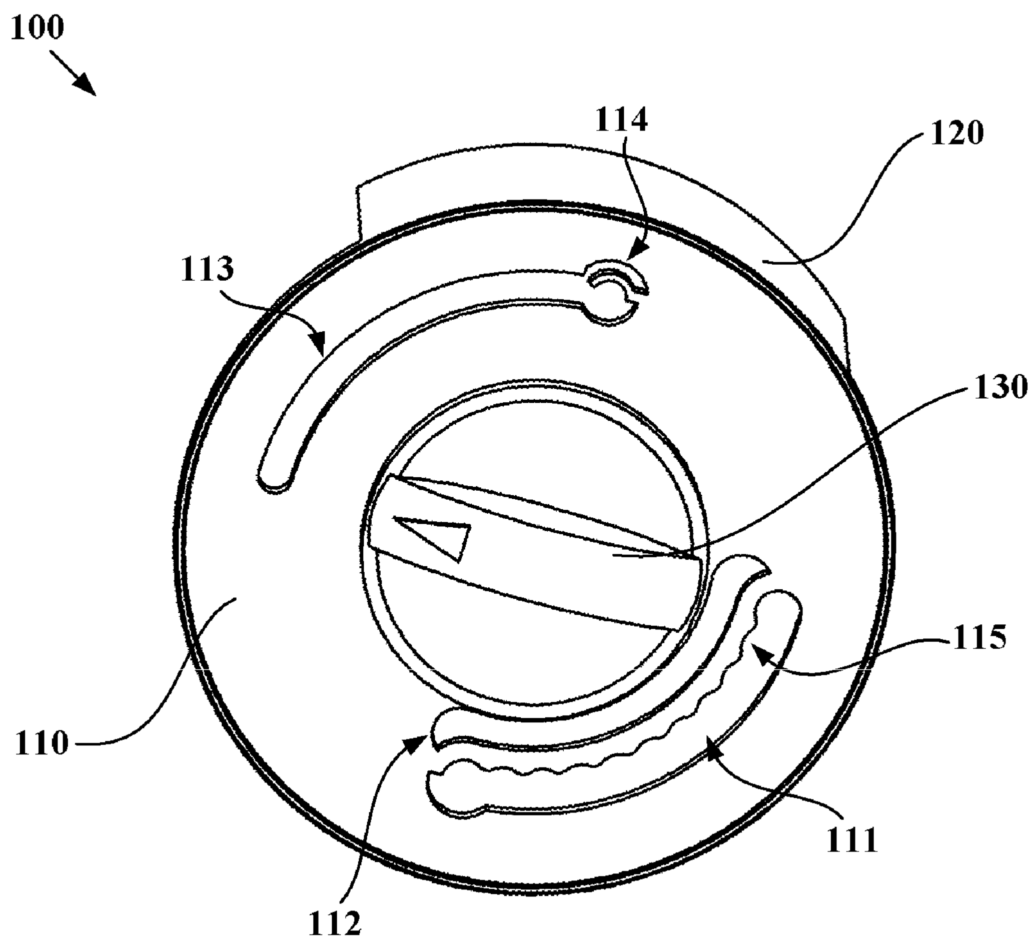
FIG. 3 is a schematic structural view of an air door of the air passage device shown in FIG. 1.

FIG. 1 is a schematic structural view of an air passage device of a refrigerator according to an embodiment of the present invention. FIG. 2 is schematic exploded view of the air passage device shown in FIG. 1. FIG. 3 is a schematic structural view of an air door of the air passage device shown in FIG. 1. For an air-cooled refrigerator, article storage compartments are defined in the refrigerator inner tank; an air passage device is arranged at the rear side of the article storage compartment; and an air passage is arranged in the air passage device for transporting cooling air to the article storage compartment. As shown in FIGS. 1-3, an air passage device 101 generally may comprise an air passage cover plate 200, air passage foam 300 and at least one air door 100. The air passage cover plate 200 is arranged in front of the rear wall of the refrigerator inner tank, and is separated from the refrigerator inner tank by a certain distance. The air passage foam 300, which is arranged between the air passage cover plate 200 and the refrigerator inner tank and is a foamed layer of a hollow structure, has an air passage 400 arranged therein in a predetermined direction and having one inlet and multiple outlets. The air door 100 can adjust the flow rate of the cooling air in the air passage 400 so as to adjust the temperature in the article storage compartment.

The air door 100 includes a base plate part 110 and a shielding part 120. The base plate part 110 is rotatably attached to the inner wall of the air passage cover plate 200. The shielding part 120 extends rearwards to the air passage 400 from the edge of the base plate part 110 so as to adjust the ventilation area of the air passage 400 when being rotated along with the base plate part 110. The base plate part 110 and the shielding part 120 may be of an integral structure. After adjustment, the base plate part 110 and the shielding part 120 should be stably fixed to avoid change of the ventilation area and large fluctuations of the temperature in the article storage compartment. For this purpose, the air passage device 101 of the present invention is provided with arcuate guide holes and guide columns 230 cooperating with the guide holes.

At least one arcuate guide hole (preferably two; as shown in FIG. 3, the arcuate guide holes 111 and 113) is arranged on the base plate part 110, and the hole wall of at least a part of the arcuate guide hole (the arcuate guide hole 111, for example) is provided with multiple limiting portions 115. The base plate part 110 is further provided with an elongate through hole 112 parallel with the arcuate guide hole 111 and close to the side at which the hole wall is provided with the limiting portions 115. As shown in FIG. 3, preferably multiple limiting portions 115 are arranged on the hole wall at the side close to the center of the base plate part 110. The guide column 230 extends rearwards from the inner wall of the air passage cover plate 200, and is inserted into a corresponding arcuate guide hole 111. The guide column 230 are the arcuate guide hole 111 cooperate with each other by interference fit so that when the base plate part 110 rotates, the hole wall of the arcuate guide hole 111 close to the elongate through hole 112 (namely, the hole wall provided with the limiting portion 115) is elastically deformed to cause the guide column 230 to enter a limiting portion 115 to limit the rotation freedom of the base plate part 110. Thus, the base plate part 110 cannot rotate easily.

The extension length of the arcuate guide hole should be set such that when the guide column 230 is located at one end of the arcuate guide hole, the shielding part 120 completely opens the air passage 400, and when the guide column 230 is located at the other end of the arcuate guide hole, the shielding part 120 completely closes the air passage 400. The multiple limiting portions 115 are arranged circumferentially along the hole wall to form different adjustment shifts, so that the adjustment process will be more accurate. In addition, an elongate through hole 114 may be arranged near the end of the arcuate guide hole 113, so that when the guide column 230 moves to this end, the hole wall close to the elongate through hole 114 is elastically deformed to clamp the corresponding guide column 230 tightly. When there are two arcuate guide holes, there are also two guide columns 230 cooperating with the arcuate guide holes, and the two guide columns are arranged at 180 degrees relative to each other so that the rotation of the base plate part 110 is more stable and rotation deflection is avoided.

The limiting portion 115 may be a recess portion recessed from the hole wall of the arcuate guide hole 111 and away from the arcuate guide hole 111. The limiting portion 115 may be arranged on the two relatively longer hole walls of the arcuate guide hole 111 respectively, or only on one hole wall thereof (see FIG. 3).

In some embodiments, the shielding part 120 may be an arcuate baffle plate extending rearwards from the edge of the base plate part 110. The chord length of the arcuate baffle plate should not be smaller than the distance between two transverse sidewalls of the air passage 400, so that when the arcuate baffle plate is rotated by a certain angle (when the line connecting the two ends of the arcuate baffle plate is perpendicular to the transverse sidewalls of the air passage 400), the air passage 400 can be completely closed. Further, to achieve better sealing effect when the arcuate baffle plate completely closes the air passage 400, the chord length of the arcuate baffle plate may be larger than the distance between the two transverse sidewalls of the air passage 400. In this case, to allow the arcuate baffle plate to rotate in the air passage 400, at least one transverse sidewall of the air passage 400 is provided with an arcuate notch matched with the outer diameter of the arcuate baffle plate. For the sake of simplicity, an arcuate notch is provided to only one transverse sidewall 310, and no arcuate notch is provided to the other transverse sidewall 320, as shown in FIG. 2.

As described above, the air passage 400 is defined by the air passage foam 300, and the base plate part 110 of the air door 100 is attached to the inner wall of the air passage cover plate 200 and is located between the air passage foam 300 and the air passage cover plate 200; in other words, the base plate part 110 is located outside the air passage 400. Therefore, to allow the shielding part 120 to pass through the air passage foam 300 and enter the air passage 400, in some embodiments, the air passage foam 300 is provided with an arcuate make-way recess 330 to allow the arcuate baffle plate to pass through. To simplify the formation process, the base plate part 110 may be of a circular plate structure; and the inner wall of the air passage cover plate 200 may be provided with an annular protruding rib 220 protruding outwards so that the base plate part 110 can be rotatably arranged at a radial inner side of the annular protruding rib 220 and can be better positioned. The front surface of the base plate part 110 may be provided with a circular knob 130, and the air passage cover plate 200 may be provided with a circular make-way hole 210 to allow the circular knob 130 to extend out of the air passage 400 via the circular make-way hole 210 and to be exposed outside the article storage compartment, so that the user can manually adjust the knob. To simplify the machining process, the circular knob 130 and the base plate part 110 may be of an integral member made by an integral formation process.

In some embodiments, the air passage device 101 further comprises a cover plate 140, which is arranged at the back of the base plate part 110 and parallel with the base plate part 110 and is fixed on the air passage foam 300. The end of the arcuate baffle plate is abutted against the surface of the cover plate 140 to avoid direct contact with the air passage foam 300 and damages thereto during rotation.

Figure 4:
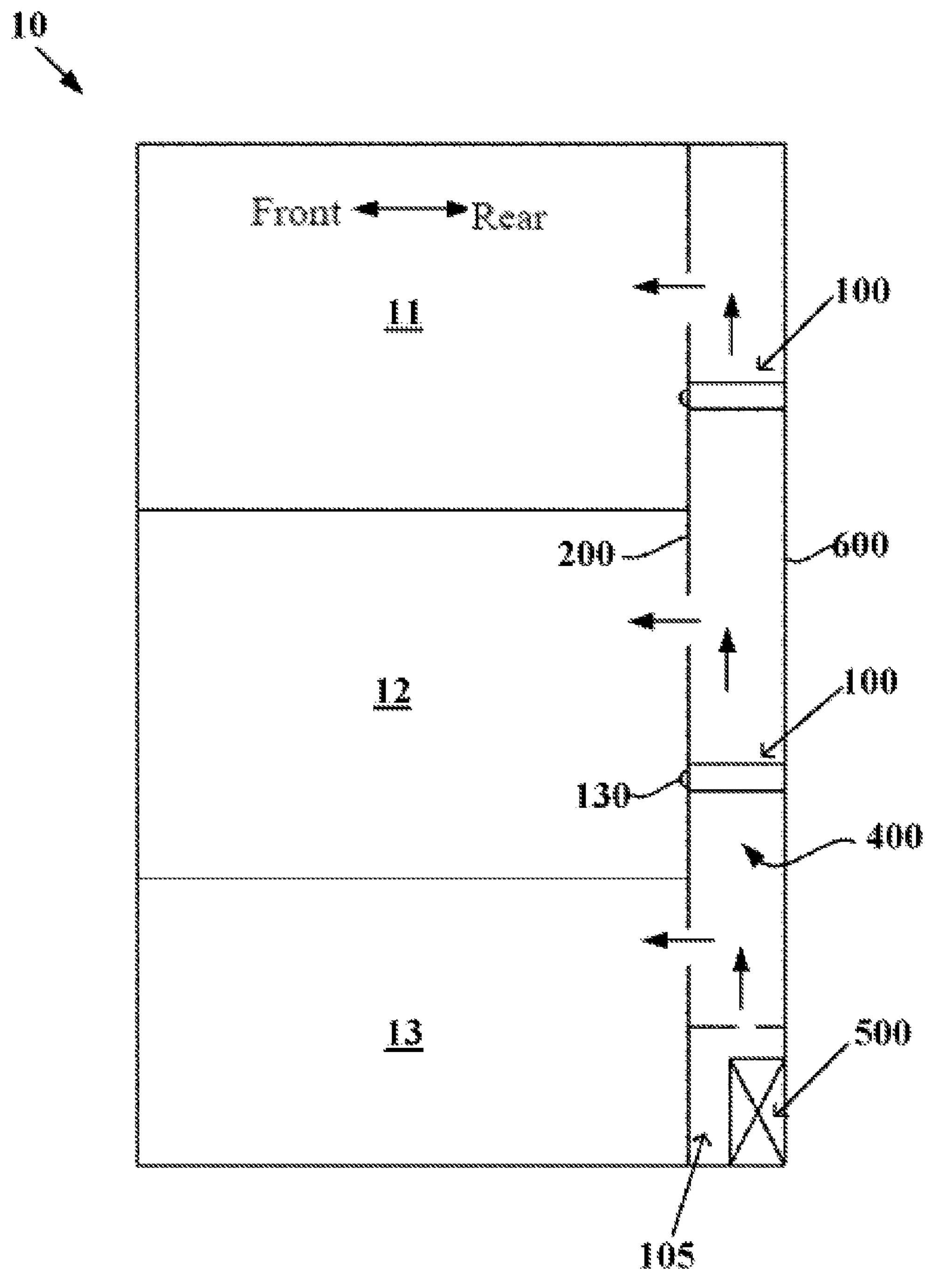
FIG. 4 is a schematic structural view of a refrigerator according to an embodiment of the present invention.

FIG. 4 is a schematic structural view of a refrigerator according to an embodiment of the present invention. Referring to FIGS. 1-4, the refrigerator 10 is an air-cooled one, and comprises a refrigerator inner tank 600, article storage compartments defined by the refrigerator inner tank 600, a cooling chamber 105, an evaporator 500 arranged in the cooling chamber and the above mentioned air passage assembly 101. The air passage cover plate 200 is arranged in front of the rear wall of the refrigerator inner tank 600. The air passage foam 300 (not shown in FIG. 4) is arranged between the refrigerator inner tank 600 and the air passage cover plate 200 and defines the air passage 400. The air passage 400 communicates the respective article storage compartments with the cooling chamber 105, so that the cooling air produced by the evaporator 500 can be transported to the respective article storage compartments via the cooling chamber 105 and refrigeration can be realized.

In some embodiments, as shown in FIG. 4, the refrigerator 10 comprises three article storage compartments 11, 12, 13. Two air doors 100 may be arranged for adjusting the flow rates of the cooling air entering the article storage compartments 11, 12, respectively. The circular knob 130 of the air door 100 is exposed in the article storage compartment, so that the user can manually adjust the circular knob 130.

Those skilled in the art should realize that although the present description illustrates and describes various embodiments of the present invention, many other modifications or amendments conforming to the principle of the present invention can be determined directly or derived based on the content disclosed by the present invention without departing from the spirit and scope of the present invention. Therefore, the scope of the present invention should be understood and considered to have covered all these modifications or amendments.

What is claimed is:

1. An air passage device of a refrigerator, comprising an air passage cover plate arranged in front of a rear wall of a refrigerator inner tank and air passage foam arranged between the refrigerator inner tank and the air passage cover plate, the air passage foam defining an air passage, and the air passage device further comprising at least one air door, wherein the air door comprises: a base plate part which is rotatably attached to the inner wall of the air passage cover plate, and is provided with at least one arcuate guide hole with one hole wall of the arcuate guide and an elongate through hole parallel with the arcuate guide hole, wherein the hole wall of at least a part of the arcuate guide holes is provided with multiple limiting portions, and the elongate through hole is arranged close to the side at which the hole wall is provided with the limiting portions; and a shielding part which extends rearwards into the air passage from an edge of the base plate part and is configured to adjust the ventilation area of the air passage when being rotated along with the base plate part; wherein the inner wall of the air passage cover plate extends rearwards to form at least one guide column, which is inserted into a corresponding arcuate guide hole and cooperates with the arcuate guide hole by interference fit so that when the base plate part rotates, the hole wall of the arcuate guide hole close to the elongate through hole is elastically deformed to cause the guide column to enter the limiting portion to limit the rotation freedom of the base plate part.

2. The air passage device according to claim 1, wherein the shielding part is an arcuate baffle plate extending rearwards from the edge of the base plate part.

3. The air passage device according to claim 2, wherein the air passage foam is provided with an arcuate make-way recess to allow the arcuate baffle plate to pass through.

4. The air passage device according to claim 2, wherein the base plate part is of a circular plate structure; and the inner wall of the air passage cover plate is provided with an annular protruding rib protruding outwards so that the base plate part can be rotatably arranged at a radial inner side of the annular protruding rib.

5. The air passage device according to claim 2, wherein the chord length of the arcuate baffle plate is larger than the distance between two transverse sidewalls of the air passage; and at least one transverse sidewall of the air passage is provided with an arcuate notch matched with the outer diameter of the arcuate baffle plate.

6. The air passage device according to claim 1, wherein there are two arcuate guide holes, and one hole wall of one arcuate guide hole is provided with multiple limiting portions; and there are two guide columns arranged at 180 degrees relative to each other.

7. The air passage device according to claim 1, wherein the limiting portion is a recess portion recessed from the hole wall of the arcuate guide hole and away from the arcuate guide hole.

8. The air passage device according to claim 1, wherein the front surface of the base plate part is provided with a circular knob; and the air passage cover plate is provided with a circular make-way hole to allow the circular knob to extend out.

9. The air passage device according to claim 8, wherein the circular knob and the base plate part are of an integral member made by an integral formation process.

10. A refrigerator comprising a refrigerator inner tank, an article storage compartment defined by the refrigerator inner tank, a cooling chamber having an evaporator arranged therein; and an air passage device comprising an air passage cover plate arranged in front of a rear wall of a refrigerator inner tank and air passage foam arranged between the refrigerator inner tank and the air passage cover plate, the air passage foam defining an air passage; and at least one air door, the air passage device is configured to transport cooling air from the cooling chamber to the article storage compartment via the air passage of the air passage device and adjust a flow rate of the cooling air entering the article storage compartment using the air door; wherein the air door comprises: a base plate part which is rotatably attached to the inner wall of the air passage cover plate, and is provided with at least one arcuate guide hole with one hole wall of the arcuate guide and an elongate through hole parallel with the arcuate guide hole, wherein the hole wall of at least a part of the arcuate guide holes is provided with multiple limiting portions, and the elongate through hole is arranged close to the side at which the hole wall is provided with the limiting portions; and a shielding part which extends rearwards into the air passage from an edge of the base plate part and is configured to adjust the ventilation area of the air passage when being rotated along with the base plate part; wherein the inner wall of the air passage cover plate extends rearwards to form at least one guide column, which is inserted into a corresponding arcuate guide hole and cooperates with the arcuate guide hole by interference fit so that when the base plate part rotates, the hole wall of the arcuate guide hole close to the elongate through hole is elastically deformed to cause the guide column to enter the limiting portion to limit the rotation freedom of the base plate part.

11. The refrigerator according to claim 10, wherein the shielding part is an arcuate baffle plate extending rearwards from the edge of the base plate part.

12. The refrigerator according to claim 11, wherein the air passage foam is provided with an arcuate make-way recess to allow the arcuate baffle plate to pass through.

13. The refrigerator according to claim 11, wherein the base plate part is of a circular plate structure; and the inner wall of the air passage cover plate is provided with an annular protruding rib protruding outwards so that the base plate part can be rotatably arranged at a radial inner side of the annular protruding rib.

14. The refrigerator according to claim 11, wherein the chord length of the arcuate baffle plate is larger than the distance between two transverse sidewalls of the air passage; and at least one transverse sidewall of the air passage is provided with an arcuate notch matched with the outer diameter of the arcuate baffle plate.

15. The refrigerator according to claim 10, wherein there are two arcuate guide holes, and one hole wall of one arcuate guide hole is provided with multiple limiting portions; and there are two guide columns arranged at 180 degrees relative to each other.

16. The refrigerator according to claim 10, wherein the limiting portion is a recess portion recessed from the hole wall of the arcuate guide hole and away from the arcuate guide hole.

17. The refrigerator according to claim 10, wherein the front surface of the base plate part is provided with a circular knob; and the air passage cover plate is provided with a circular make-way hole to allow the circular knob to extend out.

18. The refrigerator according to claim 17, wherein the circular knob and the base plate part are of an integral member made by an integral formation process.

* * * * *